2,696,487

1,3-DIAMINOPROPANOL-2 SALT OF THEOPHYLLINE

Charles F. Geschickter, Kensington, and Leonard M. Rice, Baltimore, Md.

No Drawing. Application September 11, 1952, Serial No. 309,137

1 Claim. (Cl. 260—253)

The present invention relates to novel salts of theophylline and more particularly to theophylline diaminopropanol.

The ethylenediamine salt of the anhydrous theophylline has been used extensively as a peripheral vaso dilator, a myocardial stimulant, for pulmonary edema, as a bronchial dilator in paroxysmal dyspnea, and particularly in asthma. It is used also in Cheyne-Stokes respiration. It has also been used as a diuretic. It is available for use orally, intravenously and by enemas and suppositories, but not for intramuscular injection, because of its high alkalinity.

In spite of its widespread use, it has the distinct disadvantages of creating nausea and loss of appetite, which limits the dosage and the range of patients in which it can be used. For this reason, attempts have been made to use the glycine salt and the methyl glucosamine salt, but again similar side effects have been observed.

The present invention relates to the salting of anhydrous theophylline with 1,3-diaminopropanol-2. The preparation of this salt proceeds in the same manner as the salting of anhydrous theophylline with ethylenediamine, except in the procedure hereinafter described, the reaction has been much simplified. The resulting salt is a new compound and its chemical analysis shows that one molecule of diaminopropanol joins with two molecules of anhydrous theophylline giving the formula $C_{17}H_{26}N_{10}O_5$.

Extensive clinical trial of this product has shown that the side effects of aneurexia, nausea and vomiting are, to a large extent, eliminated while the bronchial and peripheral vaso dilator reactions are retained.

The following is an example of the preparation of this salt:

To 120 gm. of theophylline is added 3 liters of alcohol and the mixture heated to boiling. After two minutes of vigorous boiling, with most of the theophylline still undissolved, a solution of 120 gm. of 1,3-diaminopropanol-2, dissolved in 240 ml. of alcohol, is slowly added. The theophylline immediately dissolves completely and the whole mixture is maintained at boiling point for an additional minute. The clear solution is allowed to cool to 25° C. with intermittent stilling. The crystalline product is filtered, washed twice with alcohol, and then with ether. The salt, after air drying, is soluble in water to the extent of 10%, and its solution has a pH of 8.7.

Theophylline diaminopropanol can be administered in the same manner and in the same dosages as theophylline ethylenediamine or even in somewhat higher dosages because of the absence of side effects. Dosages of 300 mg. given twice daily cause no side effects. The compound may also be administered by inhalation.

We claim:

A new compound, the 1,3-diaminopropanol-2 salt of anhydrous theophylline the molar proportions of said theophylline and said diaminopropanol being 2 to 1, respectively.

No references cited.